United States Patent [19]

Di Liddo

[11] 3,999,823

[45] Dec. 28, 1976

[54] AUTOMATIC RETRIEVAL SADDLES FOR FILING CABINETS

[75] Inventor: Natale Di Liddo, Borgo San Dalmazzo (Cuneo), Italy

[73] Assignee: Istituto Grafici Bertello S.p.A., Cuneo, Italy

[22] Filed: Oct. 30, 1975

[21] Appl. No.: 627,131

[52] U.S. Cl. ............................ 312/268; 312/298; 198/750
[51] Int. Cl.² ............... B65G 17/00; A47B 49/00
[58] Field of Search .......... 312/268, 301, 298, 199, 312/200, 201, 91; 198/106, 166, 218

[56] References Cited
UNITED STATES PATENTS

| | | | |
|---|---|---|---|
| 2,885,253 | 5/1959 | Kesling | 312/298 |
| 3,108,681 | 10/1963 | Sanchez | 198/106 |
| 3,581,880 | 6/1971 | Iversen | 198/219 |
| 3,640,595 | 2/1972 | Staller et al. | 312/200 |
| 3,715,043 | 2/1973 | Weir | 198/106 |
| 3,893,741 | 7/1975 | Schick | 312/268 |
| 3,931,883 | 1/1976 | Willard et al. | 198/218 |

Primary Examiner—Paul R. Gilliam
Assistant Examiner—Victor N. Sakran

[57] ABSTRACT

A filing cabinet drawer retrieval saddle which is adapted to extract a drawer from either bank of two facing filing cabinet banks and is capable of depositing a drawer so extracted in either of two consultation locations respectively at the ends of the filing cabinet banks.

9 Claims, 7 Drawing Figures

AUTOMATIC RETRIEVAL SADDLES FOR FILING CABINETS

This invention relates to automatic retrieval saddles for automatic filing cabinet systems.

It is well known in automatic filing cabinet systems to provide two banks of filing cabinets arranged face to face, each bank having a plurality of filing cabinet drawers, and to arrange for a retrieval saddle located between these two banks so as to be capable automatically of extracting individual drawers and to deliver such drawers to consultation locations respectively at the ends of the filing cabinet banks. The filing cabinets are so arranged in order to make maximum use of minimum space available. These filing cabinet drawers can be used to hold papers, tools, spare parts or other articles and objects as desired.

In the known automatic filing cabinet systems such as described, there is a serious disadvantage which hinders efficient retrieval of the drawers, and this disadvantage resides in that when the saddle extracts a drawer from one of the banks of cabinets, it can deliver it only to the consultation location at the end of that bank, and if it is necessary to examine another drawer arranged on the same or on the other bank, it is necessary first of all to return the first mentioned drawer to its position in the bank before another drawer can be extracted from the same or the other bank.

An object of the present invention is to provide a filing cabinet drawer retrieval saddle which is adapted to extract a drawer from either bank of two facing filing cabinet banks and is capable of depositing a drawer so extracted in either of two consultation locations respectively at the ends of the filing cabinet banks.

By such arrangements, it is possible to save retrieval time and return time as compared with the known automatic filing cabinet systems at present in existence.

According to the present invention there is provided an automatic filing cabinet drawer retrieval saddle for use between two, spaced facing banks of filing cabinets having a plurality of filing cabinet drawers each adapted to be extracted by the saddle and positioned in either of two consultation locations at the ends of the banks respectively, said saddle having an extracting hook unit adapted to hook onto any of said drawers to extract same from its bank or to deposit same in one of the consultation locations or back in its bank, first drive means in the form of drive chain, belt band means or the like drivingly connected to said hook unit, second drive means in the form of drive chains, belt, band means or the like, a prime mover adapted to drive the first and second drive means in the same direction, electrically operated clutch means connecting the first drive means and the prime mover, said clutch means being operable to disconnect the prime mover from the first drive means so that the second drive means can be driven while the first drive means is stopped, electrically operable displacement means for displacing the hook unit downwards, enabling a drawer driven by the second drive means to pass over said hook unit, and electrical detection and control means for rendering the saddle operative in a sequence to extract a drawer from either filing bank by engaging the drawer with the hook unit, extracting the drawer by movement of the hook unit through the first drive means, disengaging the hook unit from the drawer by downwardly displacing the hook unit when the drawer is partially removed from the bank, terminating the drive to the first drive means by disengaging the clutch means, and completing the extraction of the drawer onto the saddle by displacing it with the second drive means until it is fully supported on the saddle, at which point the drive to the second drive means is stopped, said saddle being capable of returning the drawer to its bank or into either consultation locations essentially by a reverse of the aforesaid sequence of operations.

The invention also provides an automatic filing cabinet system having two spaced, facing banks of filing cabinets each having a plurality of drawers, and a saddle as aforesaid located between said banks, said saddle being adapted automatically to extract any of the drawers and position it in either of two consultation locations at the ends of the banks respectively.

An embodiment of the present invention will now be described, by way of example, with reference to the accompanying drawings, in which.

Figure 1:
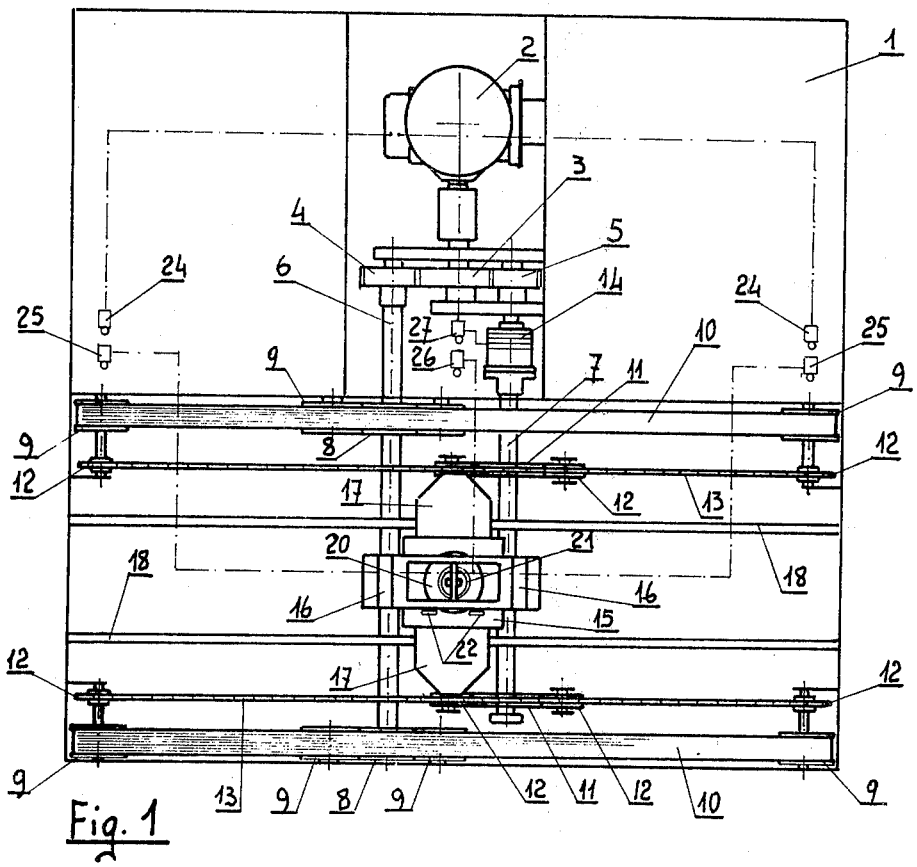
FIG. 1 is a plan view of the essential parts of the saddle according to this embodiment.

Referring to the drawings, reference numeral 1 shows the frame of the saddle, and this frame, as is well known, can move longitudinally between a pair of facing filing cabinet banks, and can also move upright, so that the saddle can extract any one of the filing cabinet drawers from either bank. The saddle includes an electric motor 2 which is arranged within the frame 1. Electric motor 2 drives gear wheel 3 which meshes with two pinions 4 and 5 respectively connected to drive shafts 6 and 7. Drive shaft 6 is provided with two driving pulleys 8 which respectively drive two endless bands 10 which respectively are located in vertical parallel planes, and which are carried by idler pulleys 9. The drive shaft 7 is connected to two gear wheels or sprockets 11 which respectively drive two endless chains 13. These chains are located in parallel planes between the endless bands 10, and the chains are carried by idler wheels 12. Shaft 7 is connected to gear 5 by means of an electric coupling 14 which forms a clutch means and this coupling is disengageable to interrupt drive from the gear 5 to the shaft 7 so as to stop the drive of the chains 13 while allowing continued drive of the bands 10.

The saddle is provided with a hook unit 16 of the construction shown, and this hook unit is supported on a support means 15. The support means has two wings 17 which respectively are connected to the chains 13 and slide on supporting guide rods 18.

The hook unit 16 can move in a vertical direction, and to this end is guided by wheels 19 carried by support 15 in order to facilitate this upward and downward movement. A spring 21 acts between the hook unit 16 and the support 15 whereby the hook unit is constantly urged in an upward direction. The hook unit 16 can be deflected downwardly by an electromagnet 20 upon appropriate energization thereof. On top of the hook unit there are idler wheels or rollers 22 which are for engaging the bottom of a drawer which is moving onto or off the saddle when the saddle is being used.

The saddle is provided with electrical detection and control means which is preferably electronic in nature, and serves for the automatic operation of the saddle. Of such means, which control the motion of the bands 10, the chains 13 and hook unit 16, only those parts necessary for explaining the operation of the saddle are described.

The hook unit 16 has a stroke on the saddle which is dictated by the length of the upper reach of each chain 13, as will be obvious from the drawings, and the stroke-limiting detectors 24 serve to reverse the motion of the motor 2, and the detectors 25 serve to control the operation of the electromagnet 20 to lower the hook unit 16. Located in the region of the middle of the stroke of the hook unit is a detector 26 which serves to operate the coupling or clutch means 14, and there is also detector 27 serving to operate the electromagnet 20 to lower the hook unit 16. When either of detectors 25 or 27 is operated, the hook unit is lowered only momentarily, and the electromagnet is quickly de-energized.

Figure 2:
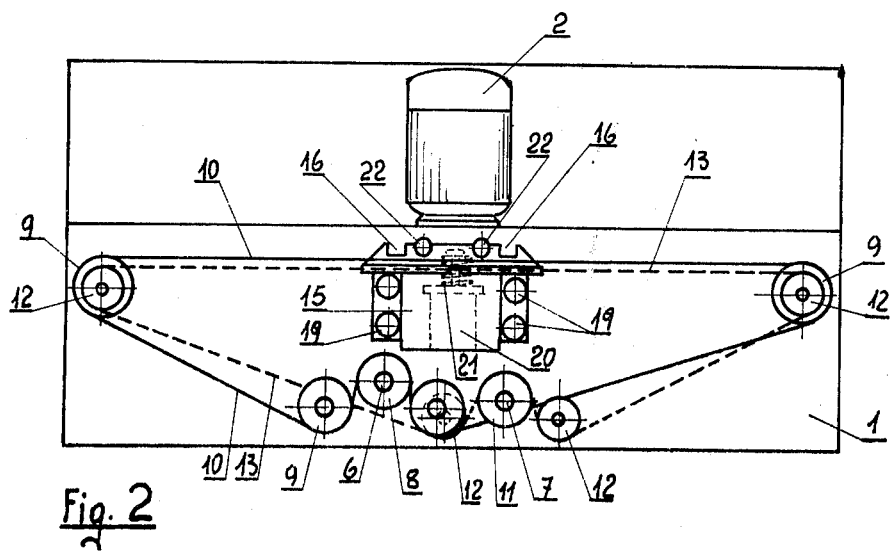
FIG. 2 is a side view of the saddle parts as shown in FIG. 1.
Figure 3:
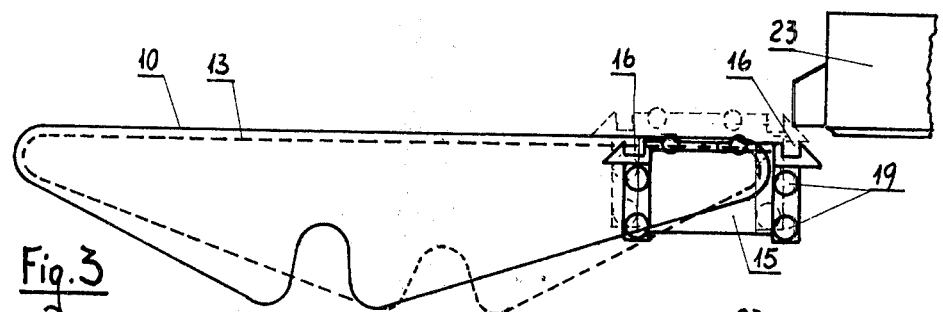
FIGS. 3 to 7 show respectively the sequence of operations when the saddle extracts a drawer from a bank of filing cabinets.
Figure 4:
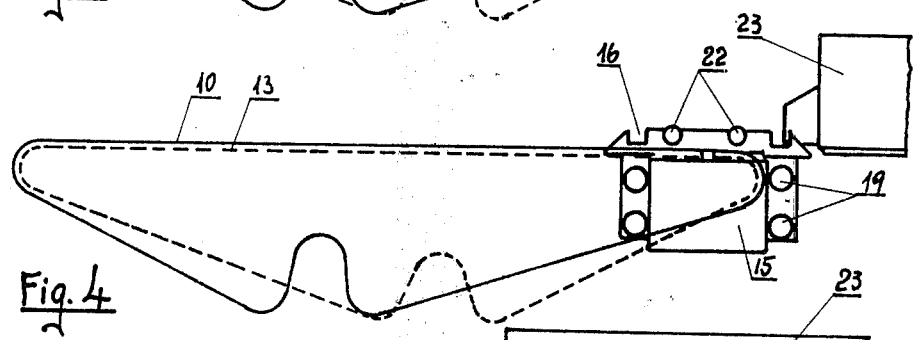

In the operation of the saddle to retrieve a drawer from a filing cabinet, the following sequence of operations takes place:

The saddle moves into register with the front of the drawer to be retrieved, the hook unit 16 being located as shown in FIG. 2. Hook unit 16 now moves automatically toward the drawers 23, the unit being driven by chains 13, and bands 10 also moving in the same direction as the chains. At the end of the stroke, hook unit 16 hooks under the handle of the drawer 23 as shown in FIG. 4. It is to be noted that the end inclined plane of the hook unit 16 acts as a wedge to push the unit 16 downwardly to enable it to hook onto the drawer as shown in FIG. 4. This is a simple mechanical hooking operation. At the appropriate time the detector 24 causes reverse motion of the bands 10 and chains 13, and the drawer is removed from the filing cabinet toward the center of the saddle to the position shown in FIG. 5. When the hook unit 16 reaches the center detector 26, the hook unit 16 is lowered by energization of the electromagnet as indicated in FIG. 6, and detector 27 causes disconnection of the drive to shaft 7 by operation of coupling or clutch means 14, so that the chains 13 stop and the bands 10 continue being driven. The drawer, therefore, continues movement out of the filing cabinet, being driven by the bands 10, and then it passes over the hook. As it does so, the wheels 22 bear against the bottom of the drawer in order to keep the hook unit permanently displaced.

When the drawer has reached the center of the saddle and has been fully extracted from the filing cabinet, the drive to motor 2 is stopped in conventional manner.

The saddle then moves to take the drawer to a consultation location at the end of either bank of filing cabinets.

Figure 5:
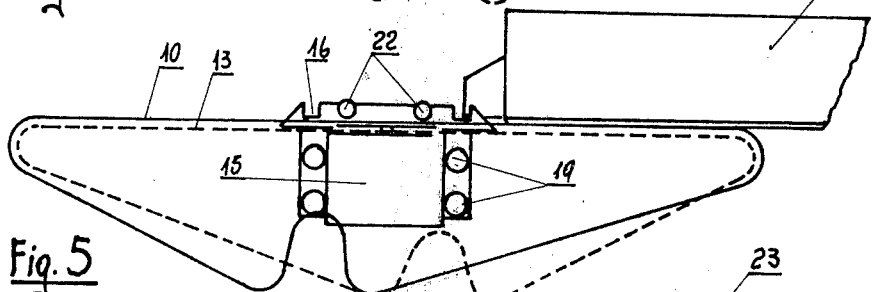
Figure 6:
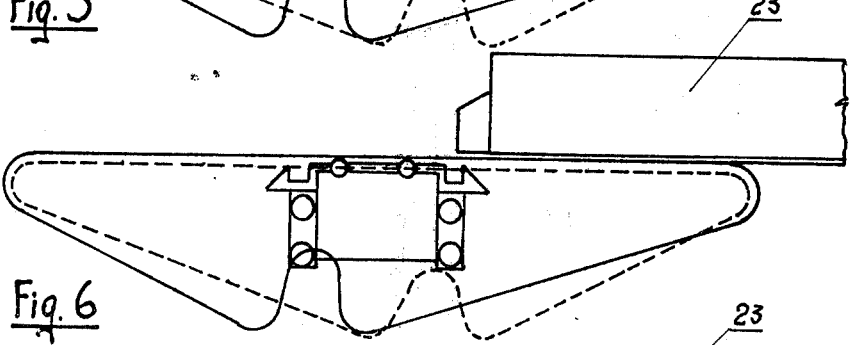
Figure 7:
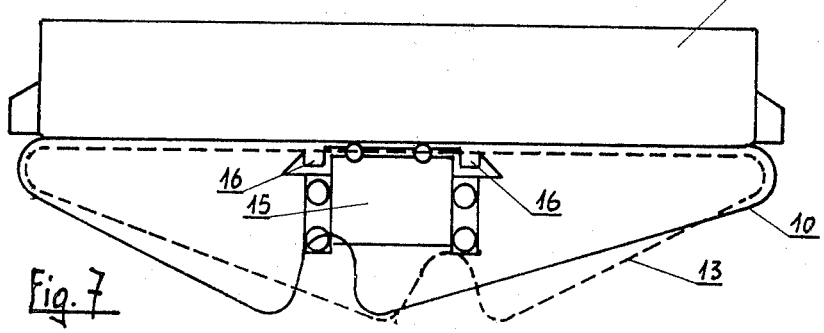

In order to discharge a drawer from the saddle, the following operation takes place:

The bands 10 are driven toward the right end figures 3 to 7 (assuming the drawer is being positioned in the right-hand consultation location) while the chains 13 remain stationary. When the drawer has cleared the hook unit 16, this unit is deflected upward by spring 21, as it is no longer constrained by the drawer, and hooks into the handle of the drawer as shown in FIG. 5. Simultaneously, the coupling or clutch means 14 engages, as the detector 26 which is in the form of a micro-switch operated by hook unit 16, is freed to operate the coupling or clutch means 14. This action results in the chains 13 being driven in the same direction as the bands 10. The chains, hook unit and bands move toward the right, guiding and pushing the drawer onto the consultation location. At the end of the stroke, the position shown in FIG. 4, detector 25 operates to cause lowering of the hook, releasing the drawer and simultaneously there is a reversal of the drive by operation of detector 24. When the hook unit reaches the center of the stroke, the motor is stopped, and the saddle awaits further instructions for the next cycle of operations.

The removal of the drawer from either consultation location is similar to the extraction of a drawer from the filing cabinet bank, and the sequence of operations in placing a drawer from the saddle into the filing cabinet bank is exactly the same for the placement of the drawer in the consultation location as described above. It is to be noted that the saddle operates on a symmetrical basis, depending upon whether or not it extracts a drawer from the right-hand bank or the left-hand bank. Furthermore, the saddle is arranged by the control circuitry of the entire system to place a drawer extracted from the right-hand bank in the right-hand consultation location, only if this location is free, and if it is not free, then the saddle will automatically place the drawer which it carries in the left-hand consultation location. Thus, the saddle and system can have two drawers for consultation at any one time, whereby there is a saving in operational time as compared to the known systems.

The embodiment of the invention which has been described above has been given as an example, and is not intended to limit the general scope of the invention as defined by the appended claims. In particular, it is intended that changes and improvements according to requirements involving the replacement of certain parts with the equivalent parts be within the scope of the present invention as defined by the said claims.

What is claimed is:

1. An automatic filing cabinet retrieval saddle for use between two spaced, facing banks of filing cabinets having a plurality of filing cabinet drawers each adapted to be extracted by the saddle and positioned in either of two consultation locations at the ends of the banks respectively, said saddle having an extracting hook unit adapted to hook onto any of said drawers to extract same from its bank or to deposit same in one of the consultation locations or back in its bank, first drive means in the form of drive chain, belt, band means or the like drivingly connected to said hook unit, second drive means in the form of drive chains, belt, band means or the like, a prime mover adapted to drive the first and second drive means in the same direction, electrically operated clutch means connecting the first drive means and the prime mover, said clutch means being operable to disconnect the prime mover from the first drive means so that the second drive means can be driven while the first drive means is stopped, electrically operable displacement means for displacing the hook unit downward, enabling a drawer driven by the second drive means to pass over said hook unit, and electrical detection and control means for rendering the saddle operative in a sequence to extract a drawer from either filing bank by engaging the drawer with the hook unit, extracting the drawer by movement of the hook unit through the first drive means, disengaging the hook unit from the drawer by downwardly displacing the hook unit when the drawer is partially removed from the bank, terminating the drive to the first drive means by disengaging the clutch means, and completing the extraction of the drawer onto the saddle by displacing it with the second drive means until it is fully supported on the saddle, at which point the drive to the second drive means is stopped, said saddle being capable of returning the drawer to its bank or into either consultation location essentially by a reverse of the aforesaid sequence of operations.

2. A saddle as claimed in claim 1, wherein said hook unit is mounted on a support for vertical movement relative thereto, said support having guide wheels for guiding the hook unit in its vertical movement relative to the support, and said displacement means comprises an electromagnet, and including spring means arranged to urge the hook unit upwardly.

3. A saddle according to claim 2, wherein the support is slidable on sliding guide rods and has wing formations respectively connected to spaced endless chains forming the first drive means.

4. A saddle according to claim 2, wherein the hook unit is provided with rollers for engaging the underside of a drawer when such drawer passes over the hook unit.

5. A saddle according to claim 1, wherein the second drive means comprises spaced endless belts lying in parallel planes, the first drive means being located between said belts.

6. A saddle according to claim 1, wherein the electrical detection and control means includes spaced, strokelimiting switches adapted to limit the displacement of the second drive means.

7. A saddle according to claim 1, wherein the electrical detection and control means includes hook unit control switches adapted to control the downward displacement of the hook unit dependent upon its position on the saddle.

8. An automatic filing cabinet system having two spaced, facing banks of filing cabinets, each having a plurality of drawers, and a saddle according to claim 1 located between said banks, said saddle being adapted automatically to extract any of the drawers and position it in either of two consultation locations at the ends of the banks respectively.

9. A system according to claim 8, including further control means effective to cause the saddle to deposit a drawer carried thereby in the other consultation location if the consultation location at the end of the bank from which the drawer is extracted is occupied by another drawer.

* * * * *